Feb. 13, 1940.   E. ZIGANKE   2,189,874
ELECTRON TUBE MOUNTING
Filed Feb. 11, 1938   2 Sheets—Sheet 1

Inventor:
Ernst Ziganke
by R. C. Nopgard
Attorney

Feb. 13, 1940. E. ZIGANKE 2,189,874
ELECTRON TUBE MOUNTING
Filed Feb. 11, 1938 2 Sheets-Sheet 2

Inventor:
Ernst Ziganke
by R C Hapgood
Attorney

Patented Feb. 13, 1940

2,189,874

UNITED STATES PATENT OFFICE 2,189,874

ELECTRON TUBE MOUNTING

Ernst Ziganke, Berlin, Germany, assignor to C. Lorenz Aktiengesellschaft, Berlin-Tempelhof, Lorenzweg, Germany, a company Application February 11, 1938, Serial No. 190,047
In Germany February 11, 1937

4 Claims. (Cl. 250—27.5)

Electronic tubes are usually provided with pins or contact members fitted to their bases in order to engage holes or springs of a socket or holder. Therefore, in order to remove such a tube from its holder, the tube is withdrawn therefrom in the direction of its axis if this is normal to the holder. Hence it is not possible to arrange any wall located immediately above the tube, because such wall would prevent the tube from being easily replaced by another.

Figure 1:
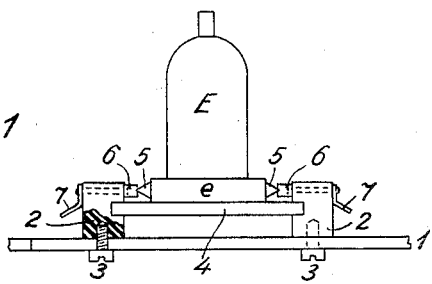
Figure 2:
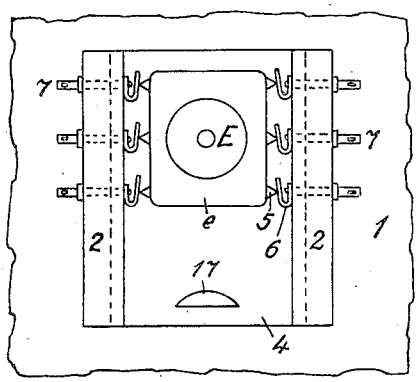
Figure 3:
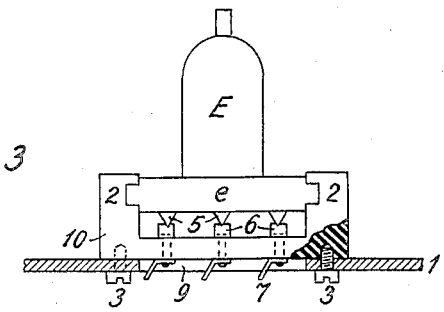

In devices as provided by the invention the tube is inserted or withdrawn by moving it in a direction parallel to the holder, as will be understood from the following description, reference being had to the accompanying drawings, in which Fig. 1 is a partially sectioned elevation of one embodiment of the invention, Fig. 2 a plan to Fig. 1; Fig. 3 is a partially sectioned elevation of another embodiment, Fig. 4 a plan to Fig. 3; Fig. 5 is a sectional view illustrating a mode of application of the arrangement represented in Figs. 1 and 2, Fig. 6 shows a section on line 6—6 of Fig. 5.

In the arrangement shown in Figs. 1 and 2 the electronic tube E is fixed by its base e to a plate 4 which is slidable in two guides 2 of insulating material. These are fastened to a plate 1 by screws 3. Plate 1 may be the bottom plate or an intermediate wall of some casing or cabinet. Base e is in the shape of a square or rectangle and at two opposite sides carries contacts 5 which are in engagement with contact springs 6 fitted to the guides 2 and formed with soldering tabs 7. Plate 1 may be of suitable length and has a thumb recess 17.

Figure 4:
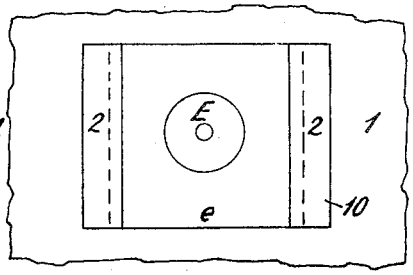
Figure 5:
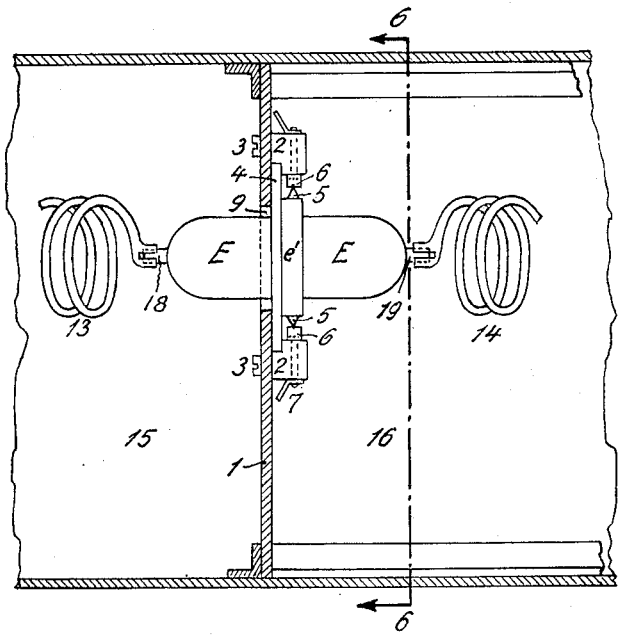

In the arrangement represented in Figs. 3 and 4 the base e of tube E is itself in engagement with the guides 2, plate 4, Figs. 1 and 2, thus being dispensed with. The guides 2 are arranged to form part of an insulating body 10 which may be moulded or die-cast. The contacts 5 here are fitted to the lower side of foot e while the contact springs 6 are mounted in the base portion of body 10, the soldering tabs 7 reaching through an aperture 9 of plate 1. The novel arrangement will be of special advantage in connection with devices intended for short or ultra-short waves. Figs. 5 and 6 relate to a device of this kind. In the case of these devices the interconnectors of parts traversed by high frequency currents should be as short as ever possible, because such interconnectors have an inductance that requires consideration whenever short waves are concerned. For instance, in the case of a high frequency stage the wire interconnecting the grid and oscillatory circuit thereof, and also the wire interconnecting the anode and anode oscillatory circuit, should be of the least possible length. In order to achieve this the leads 18, 19 to the grid and anode have been arranged in well-known manner at the ends of tube E. The oscillatory circuits of such a high frequency stage are screened from each other by a wall designated 1 in accordance with Figs. 1 to 4, the tube thus being arranged to interconnect the two chambers 15, 16 formed with the aid of wall 1 and in which the oscillatory circuits are disposed. It will thus be advantageous to have the tube E supported by wall 1, and it is the novel arrangement which is particularly useful in this regard since it provides for inserting or removing the tube in a direction parallel with wall 1. Inserting or withdrawing tube E in its axial direction is not possible because the members of the said oscillatory circuits, especially the coils 13, 14 thereof, must be in close proximity to the leads 18, 19, to which they are connected. In addition, by moving the tube in a direction parallel to wall 1 touching of the members of the circuits, such as the coils 13, 14, for instance is avoided.

Figure 6:
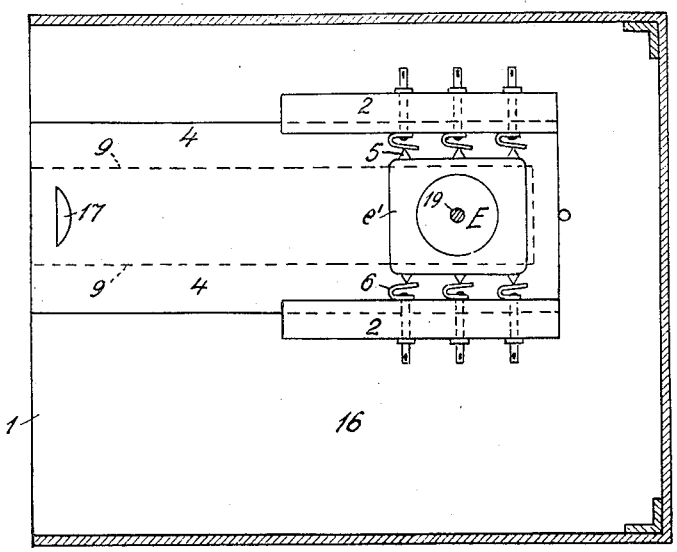

The tube E shown in Figs. 5 and 6 by way of example has a rectangular bead e' in its centre portion, this bead corresponding to the base e represented in Figs. 1 and 2. Also in other particulars the arrangement disclosed in Figs. 5 and 6 is quite similar to that shown in Figs. 1 and 2, as will be readily seen, like parts being denoted by like reference characters. Slide plate 4, fixed to bead e', is comparatively long in order to avoid touching the tube E or other operative parts when replacing it by another tube or withdrawing it for some other reason. Tube E extends through a slot 9 provided in wall 1. This slot is covered by the metal plate 4, the screening effected by wall 1 thus not being impaired by slot 9. The grid and anode leads 18, 19 are engaged by springs fitted to the ends of the coils 13, 14. The mode of mounting these coils is not shown in the drawings, being left to the designer of the apparatus. Such is the case also as regards the rotatable plate condensers which in a well-known manner are connected in parallel with the coils 13, 14.

What is claimed is:

1. An arrangement according to claim 4, wherein the guide means of the holder has two grooves adapted to receive the guide means of the electronic tube.

2. An arrangement according to claim 4, wherein the guide means of the holder is a moulded insulating body having two grooves adapted to receive the guide means of the electronic tube.

3. An arrangement according to claim 4, wherein the guide means of the electronic tube is a slide plate while the guide means of the holder has two grooves adapted to receive this slide plate.

4. An arrangement for supporting electron tubes having lead-in conductors extending from opposite ends thereof and other lead-in conductors adjacent to the center portion thereof so that said tube can be placed in a small space between other apparatus and the connections to said apparatus can be short, comprising an elongated supporting member fixed to said tube adjacent to the center thereof and having two guiding means extending perpendicularly with respect to the axis of said tube, a holder having cooperating stationary guiding means and cooperating contacts on said means first and second mentioned positioned to make contact and complete electric circuits to said tube when said tube is placed in position by sliding said supporting member into said holder with said guiding means first and second mentioned in engagement said supporting member having a hand-grip portion remote from said center portion whereby said supporting member can be inserted in said holder.

ERNST ZIGANKE.